Nov. 13, 1956 D. B. HYDE 2,770,220
BIRD FEEDER
Filed July 10, 1953

*INVENTOR.*
DONALD B. HYDE

BY
Fenway, Jenney, Witter & Hildreth

ATTORNEYS

United States Patent Office 2,770,220
Patented Nov. 13, 1956

2,770,220
BIRD FEEDER

Donald B. Hyde, Newtonville, Mass.; Joyce P. Hyde, executrix of Donald B. Hyde, deceased, assignor to Joyce P. Hyde, Newton, Mass.

Application July 10, 1953, Serial No. 367,249

3 Claims. (Cl. 119—60)

The present invention relates to feeders for wild birds and has for its primary object the provision of a feeder capable of securely holding reasonably large quantities of any suitable bird food, particularly chunky food, while providing complete and safe accessibility of the food to the birds. The feeder is moreover especially suited to the feeding of clinging birds and to small and medium sized perching birds while being substantially inaccessible to the larger species of perching birds.

In general the feeder of this invention consists of an open mesh wire basket having generally vertical sides and perches spaced outwardly from and running generally horizontally alongside the basket. An important feature in the construction is that the perches are flexibly secured to the basket at one end only, the other end being free, whereby they may be bent inwardly or outwardly to or from the basket to accommodate perching birds of smaller or larger size. In addition, such perches, especially a plurality of them, provide substantial perching space, all of which is readily accessible to the feeder. A further feature is the construction of the wire mesh walls of such mesh dimensions that a bird may insert his entire head and body between the mesh and reach food situated well within the basket.

Figure 1:
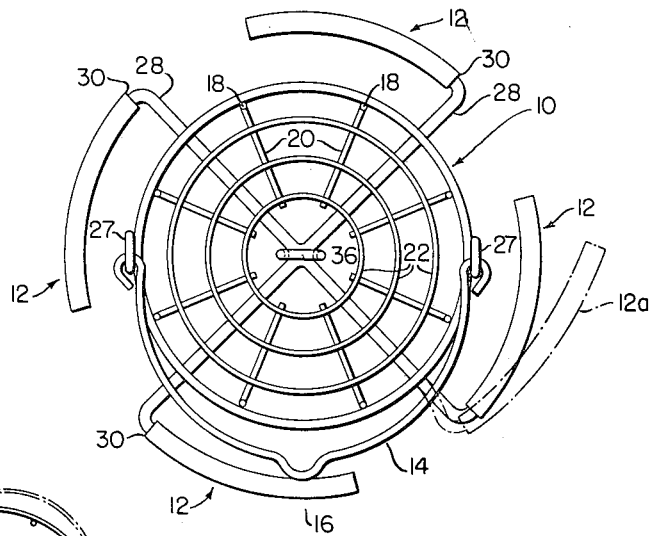
Figure 3:
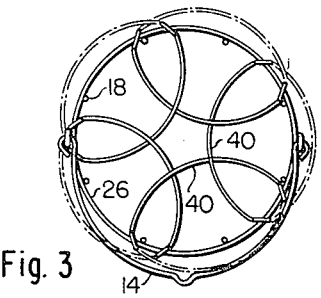
Figure 2:
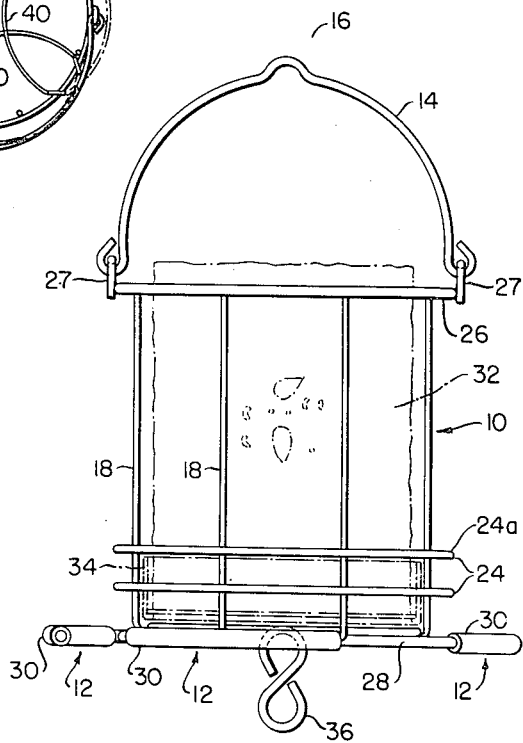

These and other objects and features will best be understood and appreciated from the following detailed description of the preferred embodiment of the invention, and from the drawings in which:

Fig. 1 is a plan view of the preferred embodiment of the feeder of this invention, and Fig. 2 is a side view of the feeder of this invention, showing also in broken lines a prepared suet cake contained within the feeder, and Fig. 3 is a plan view drawn to a reduced scale showing a collapsible mesh cover fitted to the top of the feeder.

The feeder shown in Figs. 1 and 2 consists in general of an open mesh wire basket 10, and a plurality of perches 12 spaced about one-half to three-fourths inch outwardly from and extending generally horizontally and parallel to the lower edge of the basket, together with a bail 14 pivotally secured to diagonally opposite points on the basket and having a centrally situated bight 16 by which the feeder may be suspended from any convenient support by conventional means, not shown.

The wire basket of the preferred embodiment shown in the drawings is a generally circular cylindrical structure formed of a plurality of vertical elongated side members, e. g. wires 18, each spaced from the adjacent side members by at least about one inch and each terminating at its lower end in an inwardly extending bottom section 20. A plurality of concentric bottom ring members 22 are secured, e. g. by spot welding, to the inwardly extending bottom sections 20, and together therewith form a bottom for the basket. To the lower regions of the vertical side members 18 are similarly secured one or more spaced lower side ring members 24 forming, in conjunction with the side members, a relatively close meshed lower side wall of the basket.

The region above the lower side wall is of relatively open mesh to provide an open area between the vertical side members of at least about one and one-fourth inches in height, and preferably more, through which most of the smaller perching birds and clinging birds, such as finches, chickadees or the like may enter. In the embodiment illustrated the entire vertical distance from the upper lower side ring member 24ª to the top of the vertical side members 18 is open, and there is provided an upper edge ring member 26 secured to the upper ends of the vertical side members 18. The upper edge ring member 26 secures the upper sections of the vertical side ring members together in fixed relationship and further provides structure to which the bail 14 may be pivotally fastened. This is accomplished through inverted U fasteners 27 secured to diametrically opposite points on the upper edge ring 26 and around which the ends of the bail are bent.

The perches 12, comprising in general L-shaped rods spaced outwardly from and extending alongside the lower edge of the basket, are conveniently formed in pairs from Z-shaped wire members 28 secured to the bottom of the basket with their midregions intersecting at about the center of the basket. The outer legs of the Z members 28, forming the perches 12, are preferably covered with sleeves 30 of rubber or similar soft flexible material.

So that the feeder may be suspended near an open window and anchored to prevent swinging, an eyelet 36, formed of an S hook attached at the intersection of the midsection of the Z members, is also provided. The eyelet 36 provides also a convenient means of fastening a second feeder to the bottom of the feeder of this invention, or of fastening a pan to catch food that falls from the feeder.

Where the feeder is large and it is desired to prevent large birds from gaining access to the food from the top, a cover may be provided. A preferred cover construction is shown in Fig. 3 and consists of several wire bows 40 pivotally secured at their ends to the upper edge ring 26, each intermeshing with the adjacent bows. Each bow 40 preferably passes to the inside of the adjacent bow on one side and to the outside of the adjacent bow on the other side so that all are swung in unison from the closed position shown in solid lines in Fig. 3 to the open position suggested by the broken lines.

From the foregoing description it will be readily appreciated that this invention provides in particular a feeder especially suited for use with chunky foods such as suet, suet cakes, apples, doughnuts and the like and to which both perching and clinging birds of small and medium size have free access with a minimum of hindrance or obstruction from the structural elements forming the feeder. This access is moreover provided, for birds of both types, around substantially the entire periphery of the feeder, so that the food may be consumed from all sides. Moreover, the perches being spaced outwardly from the feeder do not collect droppings, and with the rubber cover provide a surface to which birds can easily cling, and also one on which they may safely clean their bills.

In the illustrated embodiment of Fig. 2 there is suggested, by broken lines, a suet cake 32 situated in the basket 10. For use in such a manner the suet cake, comprising molded suet which may, if desired, be mixed with seeds, peanut butter and other ingredients which attract birds, is formed to fit within the basket, conveniently in a cylindrical paper container having a friction top with a downwardly extending skirt. The top of the container may then be inserted inverted in the bottom of the basket, as suggested at 34, and the side walls of the container may then be stripped from the enclosed cake which is placed on the inverted container top. In such use it has been found convenient to utilize an ordinary half-pint cylindrical pasteboard ice cream container, such as that described in United States Patent No. 1,573,598, in forming and distributing the cake, and to construct the basket of a size to accommodate the container and with the top lower side ring member 24ª about level with the upper edge of inverted container top 34.

With an enclosed bottom to the basket, such as the inverted container top 34, other feeds, such as seeds, raisins or currants may also be retained in the basket, while complete access to them is provided. Other bulky foods, such as doughnuts, apples, suet pieces and the like may also be inserted in like manner, but with these no enclosing structure is necessary to retain the food in the basket.

It should further be understood that by constructing the perches in the manner described, that is spaced from and extending generally horizontally alongside the basket, and secured flexibly at one end only to the basket, they may be adjusted inwardly or outwardly as suggested at 12ª, thereby to provide or prevent an accommodating perch for the more or less larger perching birds.

Having thus disclosed my invention and described in detail a preferred embodiment thereof I claim and desire to secure by Letters Patent:

1. A feeder for wild birds comprising a cylindrical wire basket having sides formed of spaced parallel vertical rods, said rods extending inwardly at their lower ends, concentric bottom ring members secured to the inwardly extending lower ends of said rods to form a bottom to the basket, a top ring member secured to the top ends of the vertical rods, the sides of said basket being open to permit a bird the size of a finch to enter the interior thereof; a bail having a centrally situated eye pivotally secured to diagonally opposite points of the top ring member; and wire perches spaced outwardly from and extending horizontally alongside the basket around substantially the entire outer periphery thereof, said perches being flexibly secured at one end of the bottom of the basket and unsecured at the other end; and a tubular rubber-like material covering said perches.

2. The feeder defined by claim 1 wherein the perches are formed of intersecting Z-shaped members secured to the bottom of the basket with their outer free ends spaced outwardly from and extending horizontally alongside the lower edge of the basket.

3. A feeder for wild birds comprising a cylindrical wire basket having sides formed of spaced parallel vertical rods, said rods extending inwardly at their lower ends, concentric bottom ring members secured to the inwardly extending lower ends of said rods forming a bottom to the basket, a top ring member secured to the top ends of the vertical rods, and at least one side ring member secured to the vertical rods near the lower edge of the sides of the basket, said vertical rods being spaced at least about one inch apart and said side ring member being spaced at least one and one-fourth inches from the top ring member; a bail having a centrally situated eye pivotally secured to diagonally opposite points of the top ring member; and a plurality of intersecting Z-shaped rods secured to the bottom of the basket with their outer free ends spaced outwardly from and extending horizontally alongside the lower edge of the basket.

References Cited in the file of this patent

UNITED STATES PATENTS

| | | |
|---|---|---|
| 133,442 | Gunther | Nov. 26, 1872 |
| 1,287,773 | Schumacher | Dec. 17, 1918 |
| 1,319,060 | Gardon | Oct. 21, 1919 |
| 1,531,842 | Carpenter | Mar. 31, 1925 |
| 1,558,316 | Tipple | Oct. 20, 1925 |
| 1,575,101 | Edwards | Mar. 2, 1926 |
| 1,954,286 | Dercum | Apr. 10, 1934 |
| 2,241,259 | Hanson | May 6, 1941 |
| 2,518,549 | Hyde | Aug. 15, 1950 |
| 2,570,663 | Guarino | Oct. 9, 1951 |
| 2,695,006 | Tellefson | Nov. 23, 1954 |

FOREIGN PATENTS

| | | |
|---|---|---|
| 538,040 | Germany | Nov. 9, 1931 |
| 734,558 | France | Aug. 2, 1932 |